United States Patent [19]

Ravinsky

[11] 4,367,396

[45] Jan. 4, 1983

[54] THERMAL TOOL INCLUDING TWISTED TIP FOR THE TOOL AND METHOD OF MAKING TIP

[75] Inventor: John Ravinsky, Rockville, Md.

[73] Assignee: Pace Incorporated, Laurel, Md.

[21] Appl. No.: 170,926

[22] Filed: Jul. 21, 1980

[51] Int. Cl.³ .............................................. H05B 3/00
[52] U.S. Cl. .................................... 219/233; 219/231; 219/235
[58] Field of Search ...................... 219/233, 235, 221; 128/303.1; 83/171; 433/27

[56] References Cited

U.S. PATENT DOCUMENTS

| | | | |
|---|---|---|---|
| 1,366,756 | 1/1921 | Wappler | 219/233 |
| 2,701,835 | 2/1955 | Anton | 219/235 |
| 3,401,255 | 9/1968 | Davis | 219/233 |
| 3,526,750 | 9/1970 | Siegel | 219/233 |
| 3,847,153 | 11/1974 | Weissman | 219/233 |

Primary Examiner—Bernard Roskoski
Attorney, Agent, or Firm—Gerald J. Ferguson, Jr.; Joseph J. Baker

[57] ABSTRACT

A thermal tool and tip for the tool are disclosed. The tip includes a twisted loop of heat generating wire where the ends thereof are adapted for insertion into electrical connectors in the end of the tool. The loop is twisted at an intermediate portion and terminates in a working tip end. The flexibility of the working tip end with respect to the legs can be varied by selecting the location of the twisted portion relative to the legs.

25 Claims, 15 Drawing Figures

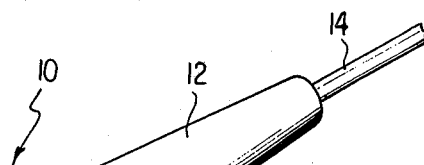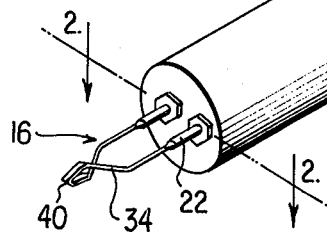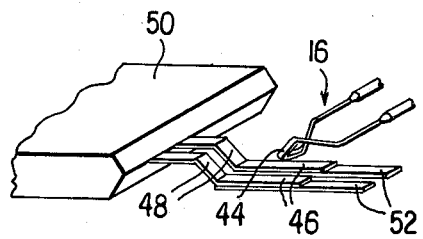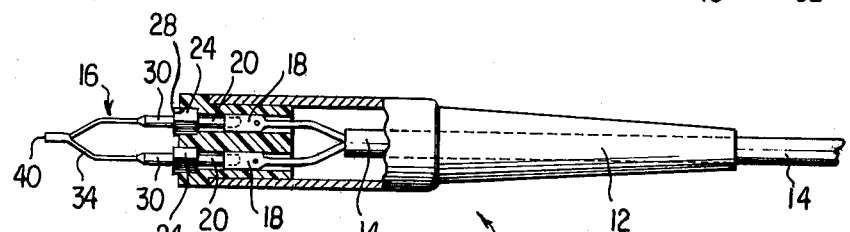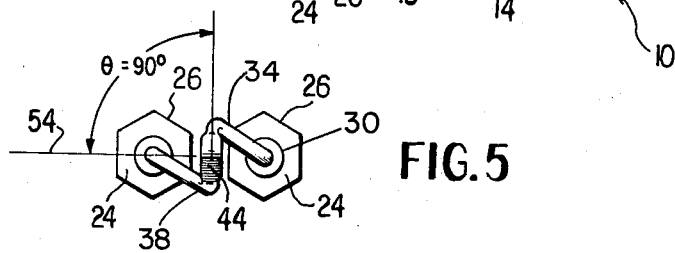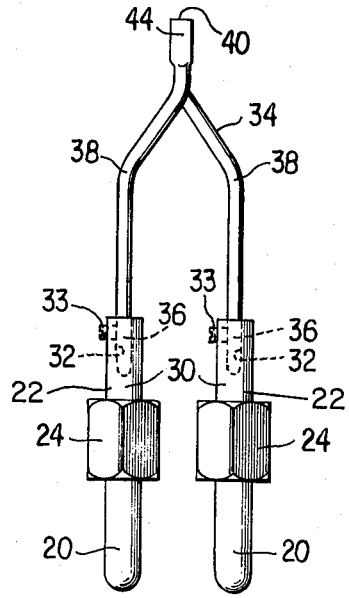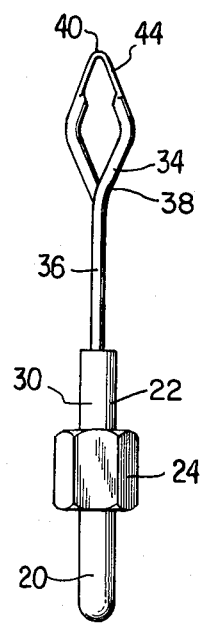

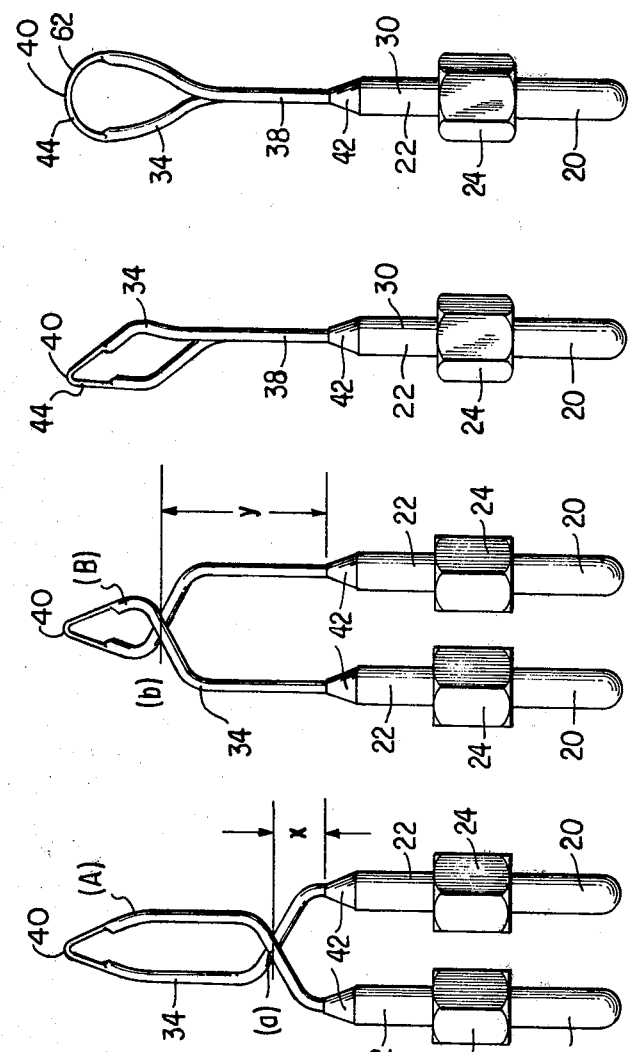

THERMAL TOOL INCLUDING TWISTED TIP FOR THE TOOL AND METHOD OF MAKING TIP

BACKGROUND AND OBJECTS OF THE INVENTION

This invention relates to thermal tools and tips for such tools and more specifically to a novel and useful tool and tip for performing operations such as soldering on micro-size electronic components.

It is a primary object of this invention to provide a thermal tool having a directly heated tip capable of performing soldering, thermal parting and other operations where, for example, a precise amount of heat is required to be applied to the very narrow (3-5 mil) connecting leads and associated circuitry of small electronic components without the substantail risk of destroying the leads, the component itself and possibly adjacent leads and components. Further, because the aforementioned leads are extremely thin in addition to their narrow width, they are particularly susceptible to being severed if the pressure of the working end of the tip against the lead is too great of damaged beyond use of an unsatisfactory configuration of the working surface of the tip itself.

The prior art structure in this area of which applicants are aware is exemplified, for example, ion U.S. Pat. No. 3,558,854 which discloses a thermal tool having a directly heated tip for applying heat to relatively small areas with some degree of control over the initial contact pressure exerted by the tip on the object to be heated. The degree of initial contact pressure is controlled by the use of compression springs located in the handle or grip member of the tool itself adjacent the ends of the tip rendering the tip capable of in and out motion only. In addition, the tip itself is made of a relatively heavy gauge material which precludes its successful use for applying heat to the very narrow leads of electronic components whose widths measure between 3 and 5 thousandths of an inch. To vary the amount of pressure exerted by the tip of the device of the prior art, it would appear to be necessary to both change the springs as well as take into consideration the flexibility of the power cord leads indirectly connected thereto—a very difficult, time-consuming and impractical procedure. The use of a loop of very thin wire has the disadvantage that the wire is inherently flexible and too easily misshaped during handling and use.

The present invention overcomes the aforementioned disadvantages of the prior art by providing a tip which is small enough for soldering or thermal parting operations and the like on the leads of micro-miniature components, has sufficient rigidity to prevent its being misshaped during handling and use but which has the desired degree of flexibility between the working end of the tip and the grip member to which it is attached to thereby reduce to a minimum the possibility of damage to the component when the tip comes in contact therewith. This is accomplished by fashioning the tip out of very small diameter, heat generating-type wire which is shaped in the form of a loop attached at its ends to legs adapted to be inserted into the end of a grip member of the type disclosed in U.S. Pat. No. 3,526,750. The working end of the tip, i.e. the area of the loop adjacent its midpoint, can be further shaped as desired depending on the application. To then impart the desired degree of flexibility between the working tip and the legs or the grip member, the loop of wire is twisted a certain degree with respect to a common plane through the legs at a point intermediate the working tip and the legs such that a plane through the intermediate portion is at an angle relative to the common plane. If the location of the twist is closer to the legs, the working end of the tip will have greater rigidity with respect to the legs and grip member and more flexibility if twisted closer to the working end of the tip. The tip of the present invention thus has springing action in all directions and not only in and out as seen in the above referenced prior art thermal tool.

It is therefore a further pirmary object of the present invention to provide a superior, directly-heated tip for thermal tools.

It is another object of the present invention to provide a tip which, due to its unique construction, is particularly suitable for soldering, thermal parting and stripping the insulation from wires and the like associated wiht micro-miniature electronic components.

It is yet another object of the present invention to provide tip for a thermal tool having a continuous, smooth working surface of any desired configuration with no sharp edges to dig or cut delicate workpieces.

It is a further object of the present invention to provide a tip for a thermal tool whose working portion can be made to possess various degrees of flexibility with respect to the member holding the tip to thereby prevent damage to the workpiece resulting from the application ofexcessive initial pressure thereon.

It is a still further object of the present invention to provide a tip for a thermal tool which is simple in construction, inexpensive to make and easily and efficiently used in conjunction with conventinoal grip members already available in the marketplace.

These together with other objects and advantages which will become subsequently apparent reside in the details of construction and operation as more fully hereinafter described and claimed, reference being made to the accompanying drawings forming a part hereof and in which:

FIG. 1 is a diagrammatic illustration of the tip and thermal tool as a whole;

FIG. 2 is a section taken along line 2—2;

FIG. 3 is an enlarged diagrammatic illustration of the tip and thermal tool in use on a lead of an electronic component;

FIG. 4 is an enlarged plan view of a tip of the present invention twisted at an angle of approximately 90°;

FIG. 5 is an end view of the tip of FIG. 4;

FIG. 6 is a side view of the tip of FIG. 4;

FIG. 7 is an enlarged plan view of a tip of the present invention twisted at an angle of approximately 180°;

FIG. 8 is an end view of the tip of FIG. 7;

FIG. 9 is a side view of the tip of FIG. 7;

FIG. 10 is an enlarged illustration of a tip twisted for increased rigidity;

FIG. 11 is an enlarged illustration of a tip twisted for increased flexibility;

FIG. 12 is an enlarged side view of a tip of the present invention with the end portion both twisted and bent at an angle;

FIG. 13 is an end view of the tip of FIG. 12;

FIG. 14 is an enlarged side view of a tip of the present invention with a continuous, rounded end portion; and FIG. 15 is an end view of the tip of FIG. 14.

DETAILED DESCRIPTION OF THE INVENTION

Referring now to FIGS. 1 and 2, it may be seen that the tool 10 comprises a pencil-type grip member 12 having power leads 14 extending from the end thereof and a heating tip 16 detachably mounted at the front end thereof. The heating tip 16 is held by electrical connectors 18 which frictionally grip the inner portion 20 of legs 22 and maintain good electrical connection between tip 16 and the terminus of power lead 14. The legs 22 have center portion 24 which serves as a shoulder or stop element against insertion of tip 16 too deeply into grip member 12. In addition, the center portion 24 may have an outer surface 26 which has a particular shape such as hexagonal, for example, which mates with a similarly shaped recess 28 in the grip member 12 to thereby serve as a guide and to insure proper alignment of the legs 22. The outer portion 30 of legs 22 has a recess 32 in the end thereof for supporting the loop member 34 of the tip 16.

The loop member 34, as can be seen by referring to FIGS. 3–6, is typically a length of heat generating-type wire initially bent in a U or V-shape as will be more fully described later. The loop member 34 has end portions 36, an intermediate portion 38 and a working, heatable tip end or section 40. The end portions 36 are inserted into the recesses 32 in the outer portions 30 of legs 22 and secured there by silver solder, brazing or the like 42 (see FIG. 7).

The legs 22 could also be permanently secured to the grip member 12 in contact with electrical connectors 18 and the lower portion 20 of the legs 22 could be removably secured in the recesses 32 by means of a set screw 33 (see FIG. 4) or the like rather than by silver solder, etc. 42 as aforementioned.

The tip end 40 has a flat outer surface 44 which is obtained by flattening a section at the midpoint of the loop member 34. The flat surface 44, as can be seen by referring to FIG. 3, rests against the surface 46 of the leads 48 associated with an electronic component 50 to thereby insure, because of its increased surface area, better heat transfer across the width of the lead 48 and associated lead 52 to which it is either being attached or parted than if rounded or unflattened wire was used.

The tip end 40 is then twisted out of a plane 54 passing through and common to both legs 22 and end portions 36 to a position at an angle $\theta$ with respect to the plane 54. The tip end 40 is shown in FIG. 5 at an angle $\theta$ of 90° with respect to the plane 54. As the tip end 40 is twisted out of the plane 54, the intermediate portion 38 of the loop member 34 is also bent out of the plane 54. In this twisted position, the overall structure of the loop member 34, i.e. the component parts 36, 38, 40 thereof, are substantially more rigid or inflexible with respect to each other than would be the case if the loop member 34 was a simple, untwisted, U-shaped configuration. The loop member 34 twisted at an angle of $\theta = 90$ is very satisfactory for general purpose applications and exhibits a high degree of rigidity. It is to be understood, of course, that the tip end 40 can be twisted at an angle $\theta$ of less than or greater than 90° when necessary for different applications with a corresponding reduction in the overall rigidity between the aforementioned component parts 36, 38, 40.

If the tip end 40 is twisted an angle $\theta$ equal to 180°, it will rest back in plane 54 as can be seen in FIGS. 7, 8 and 9. In this embodiment, the tip end 40 is substantially in the shape of a second small loop 56. The sides 58 of the small loop 56 can serve to sever the insulation around wire and thus act as a simple but effective wire stripper. A gap 60 must, however, be maintained between the sides 58 of the small loop 56 in order for the electric current to pass therethrough and heat same. The gap 60 also facilitates the insertion of insulated wire into the loop prior to the stripping operation.

Applicants have discovered that in addition to the increase in the rigidity of the structure of loop member 34 resulting from twisting the tip end 40 at an angle $\theta$ with respect to plane 54 as aforedescribed, the degree of flexibility of the loop member 34 with respect to the legs 22 and grip member 12 can also be varied considerably depending on where the twist is imparted. Referring to FIGS. 10 and 11, if the twist (a) shown in FIG. 10 of the intermediate portion 38 is caused to occur a distance (x) which is close to the legs 22, the resulting large tip end (A) will be less flexible with respect to the legs 22 than will occur as shown in FIG. 11 wherein the twist (b) is caused to occur a distance (y) which is more remote from the legs 22. When the twist (b) is caused to occur a distance (y), the tip end (B) will be considerably smaller than (A) and will exhibit more flexibility with respect to legs 22 and grip member 12. In effect, by varying the location of the twist, the section modulus is varied which is the ratio of the moment of inertia of the cross-section of the loop member 34 undergoing flexure to the greatest distance of an element of the loop fro the neutral axis through the center of the loop member. Thus, by simply choosing the location of the twist position, the flexibility of the tip end 40 can be determined with respect to the legs 22 and grip member 12 thus eliminating the necessity of providing springs or other methods of imparting flexibility as shown in the prior art.

FIGS. 12 and 13 show a modification of a heating tip 16 wherein the tip end 40 is not only twisted at an angle $\theta$, the tip end 40 as well as a part of the intermediate portion 38 is also bent out of the plane 54 an amount to insure that the flat outer surface 44 will be substantially parallel to the workpiece (not shown) when the grip member 12 is held in particular position.

FIGS. 14 and 15 show another modification of a heating tip 16 wherein the tip end 40 has a substantially arcuate shaped surface 62. This arcuate surface 62 enables, by a simple rocking motion of the loop member 34, contact to be made over a large area of the tip and thus, greater heat distribution on the workpiece (not shown). The arcuate surface 62 also helps reduce the possibility of damage to the workpiece surface.

With regard to the method of making the heating tip 16, a length of heat generating-type wire is provided which may be flattened at its approximate midpoint to provide a flat surface which will eventually become tip end 40. The wire is then bent into a substantially U or V-shaped loop. The ends of the wire may then be secured to the ends of the legs 22 by brazing or the like and the twist is imparted intermediate the tip end 40 and legs 22 at a position depending on the degree of flexibility desired as described above. The tip end 40 can then be further bent if desired for special application work.

A thermal tool has thus been described which allows the user to readily change to a tip configured for a particular heating or thermal parting application. Because most applications require intense heat to be applied only to pinpoint areas which are often very fragile in nature, the tactile feel of the tip resulting from its flexibility considerably reduces the possibility of damage due to cutting or overheating.

In addition, the different angles of attack provided by a complete set of heating tips (e.g. the diverse tips of FIGS. 6 and 12) permit a skilled operator to work on what normally are inaccessible locations on a circuit board without ruining the circuit as a whole. Further, tips having a 180 degree twist are ideally suited for stripping insulation from wire.

While the foregoing description of this invention has been in terms of specific preferred modes, such variations therefrom as will suggest themselves to workers in the art are contemplated as falling within the scope of the annexed claims.

What is claimed is:

1. A tip member for a thermal tool comprising:
   (a) leg means adapted to connect a tip member to a thermal tool, said leg means lying in a common plane, and
   (b) loop means having two end portions and intermediate portions terminating at a heatable tip section, said end portions being connected to said leg means and said intermediate portions and tip section being at a twisted position with respect to said two end portions such that respective intermediate portions do not contact each other and a plane through said intermediate portions is at an angle relative to said common plane and wherein said twisted position of said intermediate portions is such that said plane through said intermediate portions is at an angle equal to or less than 90° relative to said common plane.

2. The tip member as set forth in claim 1 wherein said intermediate portion is twisted relative to said end portions at a point substantially adjacent said heatable tip section to effect greater flexibility of said intermediate portion relative to said leg means.

3. The tip member as set forth in claim 1 wherein said loop means consists of heat generating-type wire.

4. The tip member as set forth in claim 1 wherein said tip section has an outer surface that is relatively flat.

5. The tip member as set forth in claim 1 wherein said tip section is substantially V-shaped.

6. The tip member as set forth in claim 1 wherein said tip section has a midpoint which lies in said common plane.

7. A tip member as in claim 1 where said angle is approximately 90°.

8. A method of making a tip member for a thermal tool comprising the steps of:
   (a) providing a loop of heat generating-type wire having intermediate portions terminating at a heatable tip section and two end portions, and
   (b) twisting said intermediate portions and tip section relative to said end portions such that respective intermediate portions do not contact each other and a plane through said intermediate portions is at an angle with respect to a plane common through said end portions wherein said twisted position of said intermediate portions is such that said plane through said intermediate portions is at an angle equal to or less than 90° relative to said common plane.

9. The method as set forth in claim 8 wherein said intermediate portion is twisted relative to said end portions at a point substantially adjacent said heatable tip section to effect greater flexibility of said intermediate portion relative to said end portions.

10. The method as set forth in claim 8 comprising the additional step of forming said tip section to a substantially V-shape.

11. The method as set forth in claim 8 comprising the additional step of forming a portion of said tip section into a relatively flat surface.

12. A method as in claim 8 where said angle is approximately 90°.

13. In a thermal tool having a grip of the pencil-type, power leads at the end of said grip attached to a pair of electrical connectors and a quick-release removable resistance heated tip member at the front of said grip, said tip member further comprising:
   (a) leg means adapted to connect said tip member to said electrical connectors, said leg means lying in a common plane, and
   (b) loop means having two end portions and an intermediate portions terminating at a heatable tip section, said end portions being connected to said leg means and said intermediate portions and tip section being at a twisted position with respect to said two end portions such that respective intermediate portions do not contact each other and a plane through said intermediate portions is at an angle relative to said common plane wherein said twisted position of said intermediate portions is such that said plane through said intermediate portions is at an angle equal to or less than 90° relative to said common plane.

14. In a thermal tool as set forth in claim 13 wherein said intermediate portion is twisted relative to said end portion at a point substantially adjacent said heatable tip section to effect greater flexibility of said intermediate portion relative to said leg means.

15. In a thermal tool as set forth in claim 13 wherein said tip section has an outer surface that is relatively flat.

16. In a thermal tool as set forth in claim 13 wherein said tip section is substantially V-shaped.

17. In a thermal tool as set forth in claim 13 wherein said tip section has a midpoint which lies in said common plane.

18. A tip member as in claim 13 where said angle is approximately 90°.

19. A tip member for a thermal tool comprising: a loop means having two end portions lying in a common plane and intermediate portions terminating at a heatable tip section, said intermediate portions and tip section being at a twisted position with respect to said two end portions respective intermediate portions do not contact each other and such that a plane through said intermediate portions is at an angle relative to said common plane wherein said twisted position of said intermediate portions is such that said plane through said intermediate portions is at an angle equal to or less than 90° relative to said common plane.

20. The tip member as set forth in claim 19 wherein said intermediate portion is twisted relative to said end portions at a point substantially adjacent said heatable tip section to effect greater flexibility to said intermediate portion relative to said end portions.

21. The tip member as set forth in claim 19 wherein said loop means consists of heat generating-type wire.

22. The tip member as set forth in claim 19 wherein said tip section has an outer surface that is relatively flat.

23. The tip member as set forth in claim 19 wherein said tip section is substantially V-shaped.

24. The tip member as set forth in claim 19 wherein said tip section has a midpoint which lies in said common plane.

25. A tip member as in claim 19 wherein said angle is approximately 90°.

* * * * *